United States Patent
Cezanne et al.

(10) Patent No.: US 11,888,771 B2
(45) Date of Patent: Jan. 30, 2024

(54) BEAM PROCEDURE INFORMATION FOR CHANNEL STATE INFORMATION REFERENCE SIGNALS (CSI-RS)

(71) Applicant: QUALCOMM Incorporated, San Diego, CA (US)

(72) Inventors: Juergen Cezanne, Ocean Township, NJ (US); Jianghong Luo, Skillman, NJ (US); Sundar Subramanian, San Diego, CA (US); Muhammad Nazmul Islam, Edison, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 15/969,928

(22) Filed: May 3, 2018

(65) Prior Publication Data

US 2018/0323926 A1 Nov. 8, 2018

Related U.S. Application Data

(60) Provisional application No. 62/502,561, filed on May 5, 2017.

(51) Int. Cl.
*H04W 72/04* (2023.01)
*H04W 72/12* (2023.01)
(Continued)

(52) U.S. Cl.
CPC ......... *H04L 5/0048* (2013.01); *H04B 7/0695* (2013.01); *H04B 7/088* (2013.01);
(Continued)

(58) Field of Classification Search
CPC .. H04B 7/0617; H04B 7/0626; H04B 7/0695; H04B 7/0639; H04B 7/0413;
(Continued)

(56) References Cited

U.S. PATENT DOCUMENTS 9,900,891 B1    2/2018  Islam et al.
2013/0156120 A1  6/2013  Josiam et al.
(Continued)

FOREIGN PATENT DOCUMENTS

JP    2020504985 A    2/2020
WO   WO-2016086144 A1  6/2016
(Continued)

OTHER PUBLICATIONS

International Search Report and Written Opinion—PCT/US2018/031033—ISA/EPO—dated Sep. 4, 2018.
(Continued)

*Primary Examiner* — Sai Aung
(74) *Attorney, Agent, or Firm* — Patterson + Sheridan, L.L.P.

(57) ABSTRACT

Certain aspects of the present disclosure provide techniques for beam refinement. A base station provides information regarding what transmit beams are used to transmit different reference signal (RS) resources. In some cases, the information indicates whether a same transmit beam is used to transmit a set of RS resources (e.g., symbol, sub-symbol, or frequency resources) or whether different transmit beams are used to transmit the set of RS resources.

20 Claims, 13 Drawing Sheets

(51) Int. Cl.
*H04W 24/10* (2009.01)
*H04L 5/00* (2006.01)
*H04W 72/044* (2023.01)
*H04B 7/06* (2006.01)
*H04B 7/08* (2006.01)
*H04W 72/23* (2023.01)

(52) U.S. Cl.
CPC ......... *H04L 5/0057* (2013.01); *H04W 72/046* (2013.01); *H04W 72/23* (2023.01)

(58) Field of Classification Search
CPC ...... H04B 7/0632; H04B 7/06; H04B 17/309; H04B 17/336; H04B 7/00; H04B 7/0469; H04B 7/088; H04B 7/04
See application file for complete search history.

(56) References Cited

U.S. PATENT DOCUMENTS

| | | | | |
|---|---|---|---|---|
| 2013/0322376 | A1* | 12/2013 | Marinier | H04B 7/0617 370/329 |
| 2015/0085797 | A1 | 3/2015 | Ji et al. | |
| 2016/0021548 | A1 | 1/2016 | Raghavan et al. | |
| 2016/0028519 | A1 | 1/2016 | Wei | |
| 2016/0087707 | A1 | 3/2016 | Guey et al. | |
| 2016/0142189 | A1* | 5/2016 | Shin | H04L 5/0048 370/329 |
| 2016/0143055 | A1* | 5/2016 | Nammi | H04W 74/006 370/329 |
| 2016/0254893 | A1* | 9/2016 | Yang | H04B 7/024 370/329 |
| 2016/0380734 | A1* | 12/2016 | Wang | H04L 5/0057 370/329 |
| 2017/0048775 | A1 | 2/2017 | Kim | |
| 2017/0078001 | A1* | 3/2017 | Kim | H04B 7/0469 |
| 2017/0099092 | A1* | 4/2017 | Kakishima | H04L 1/00 |
| 2017/0288763 | A1 | 10/2017 | Yoo et al. | |
| 2017/0303265 | A1 | 10/2017 | Islam et al. | |
| 2018/0070380 | A1* | 3/2018 | Nagaraja | H04B 7/00 |
| 2018/0123755 | A1* | 5/2018 | Kim | H04L 5/005 |
| 2018/0183507 | A1* | 6/2018 | Franz | H04B 17/336 |
| 2018/0205437 | A1* | 7/2018 | Kim | H04B 7/0456 |
| 2018/0278298 | A1* | 9/2018 | Takano | H04W 16/28 |
| 2018/0287722 | A1* | 10/2018 | Takano | H04L 5/0048 |

FOREIGN PATENT DOCUMENTS

| | | |
|---|---|---|
| WO | 2016159629 A1 | 10/2016 |
| WO | WO-2017022902 A1 | 2/2017 |
| WO | WO-2017074497 A1 | 5/2017 |
| WO | WO-2017204739 A1 | 11/2017 |
| WO | 2018107363 A1 | 6/2018 |

OTHER PUBLICATIONS

Guangdong Oppo Mobile Telecom: "CSI-RS Design for NR", 3GPP Draft, 3GPP TSG RAN WG1 Meeting #88bis, R1-1704610, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), XP051242749, 3 Pages, Retrieved from the Internet: URL: http://www.3gpp.org/ftp/Meetings_3GPP_SYNC/RAN1/Docs/. [retrieved on Apr. 2, 2017].
"3rd Generation Partnership Project, Technical Specification Group Radio Access Network, Study on New Radio Access Technology Physical Layer Aspects (Release 14)", 3GPP Standard, Technical Report, 3GPP TR 38.802, 3rd Generation Partnership Project, Mobile Competence Centre, 650, Route des Lucioles, F-06921 Sophia-Antipolis Cedex, France, vol. RAN WG1, No. V14.0.0, Mar. 25, 2017, 143 Pages, XP051297632.
CATT: "On Beam Determination", 3GPP TSG RAN WG1 Meeting #87, R1-1611389, Reno, USA Nov. 14-18, 2016, 3 Pages.
CATT: "Discussion on CSI-RS for Beam Management [online]", 3GPP TSG RAN WG1 #88, R1-1702087, Athens, Greece, Feb. 13-17, 2017, 4 Pages.
Ericsson: "Beam management principles", 3GPP TSG-RAN WG1 #86bis, R1-1609754, Lisbon, Portugal, Oct. 10-14, 2016, pp. 1-5.
Huawei., et al., "CSI-RS Design for Beam Management", 3GPP TSG RAN WG1 NR Ad-Hoc Meeting, 3GPP TSG RAN WG1 adhoc_NR_AH_1701, R1-1700069, Spokane, USA, Jan. 16-20, 2017, 7 Pages, Jan. 9, 2017.
Huawei., et al., "DL Beam Management", 3GPP TSG RAN WG1 Meeting #88b, R1-1704229, Spokane, USA, Apr. 3-7, 2017, 10 Pages.
Huawei, et al., "Aperiodic CSI-RS Transmission for Beamformed CSI-RS", 3GPP TSG RAN WG1 Meeting #86, R1-167675, Goteborg, Sweden, Aug. 22-26, 2016, 3 Pages.
Huawei., et al., "UL Beam Management", 3GPP TSG RAN WG1 Meeting #88b, R1-1704231, Spokane, USA, Apr. 3-7, 2017, 7 Pages.
Qualcomm: "Beam Management for NR", 3GPP TSG-RAN WG1 #90, R1-1716396, Nagoya, P.R. Japan, Sep. 18-21, 2017, 6 Pages.
Taiwan Search Report—TW107115215—TIPO—dated Aug. 16, 2021.
Vivo: "Beam Management Procedure and Beam Reporting for NR", 3GPP TSG RAN WG1 Meeting #88, R1-1703388, Athens, Greece, Feb. 13-17, 2017, 5 Pages.

* cited by examiner

BEAM PROCEDURE INFORMATION FOR CHANNEL STATE INFORMATION REFERENCE SIGNALS (CSI-RS)

CLAIM OF PRIORITY UNDER 35 U.S.C. § 119

The present Application for Patent claims benefit of U.S. Provisional Patent Application Ser. No. 62/502,561, filed May 5, 2017, assigned to the assignee hereof and hereby expressly incorporated by reference herein.

INTRODUCTION

Aspects of the present disclosure relate to wireless communications, and more particularly, to refinement of transmit beams used for directional transmissions, for example, from a base station to a user equipment (UE) and/or from the UE to the base station.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide a method for wireless communications by a user equipment (UE). The method generally includes obtaining information regarding a beam refinement procedure that involves a set of resources for transmitting reference signals (RS), the information indicating which RS resources are to be transmitted by a base station using a same transmit beam, deciding, based on the information, which receive beam or beams to use for reception of the RS resources transmitted by the base station, and receiving the RS resources in accordance with the decision.

Aspects of the present disclosure provide a method for wireless communications by a base station. The method generally includes deciding which transmit beams to use for transmitting reference signal (RS) resources to a user equipment (UE) as part of a beam refinement procedure, providing information to the UE indicating which RS resources are to be transmitted by the base station using a same transmit beam, and transmitting the RS resources in accordance with the decision.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
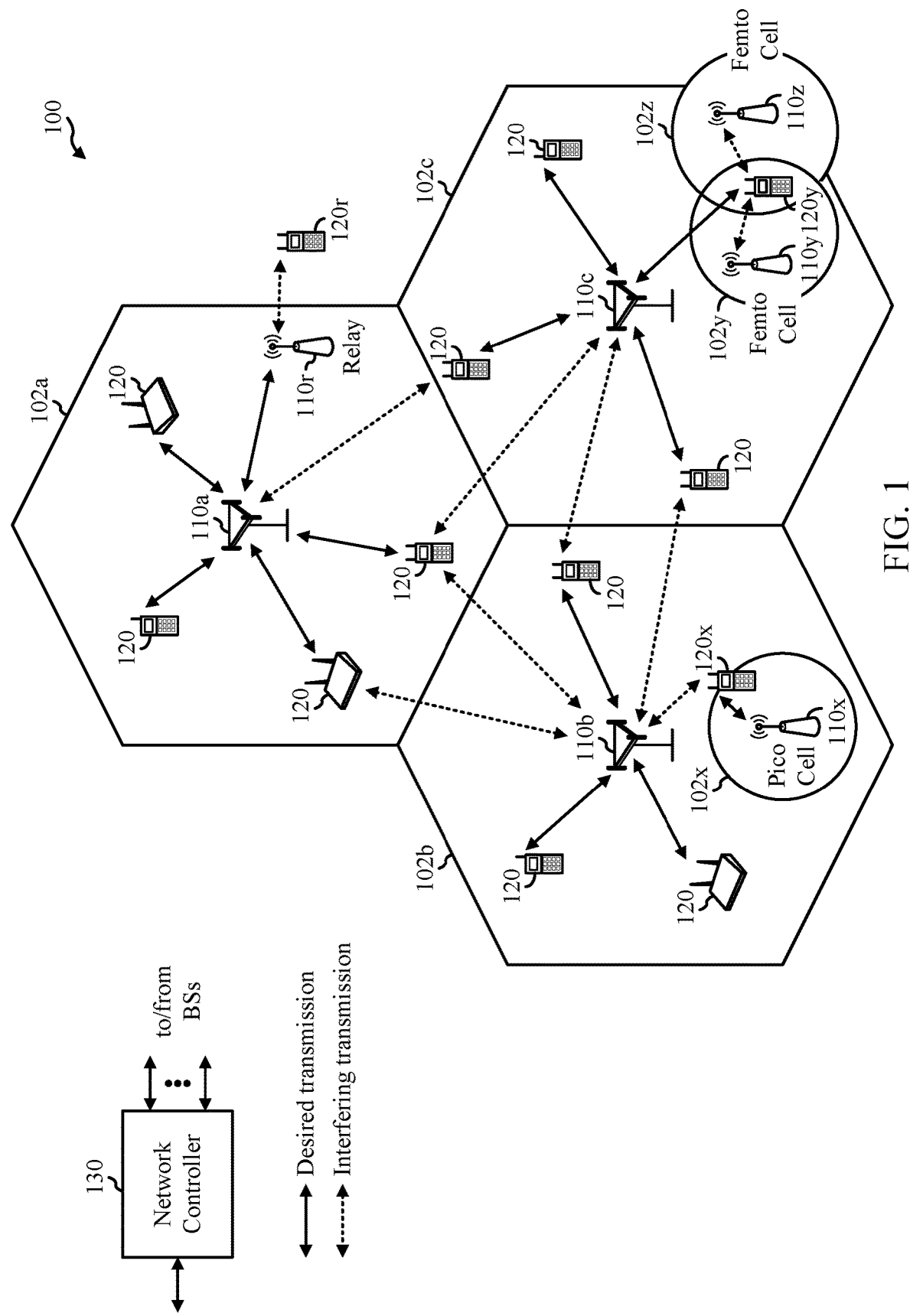
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams.

For illustrative purposes, aspects are described with reference to a primary BS and a secondary BS, wherein the secondary BS operates in an mmWave frequency spectrum and the primary BS operations in a lower frequency spectrum that the secondary spectrum; however, aspects may not be limited to this example scenario.

Figure 8:
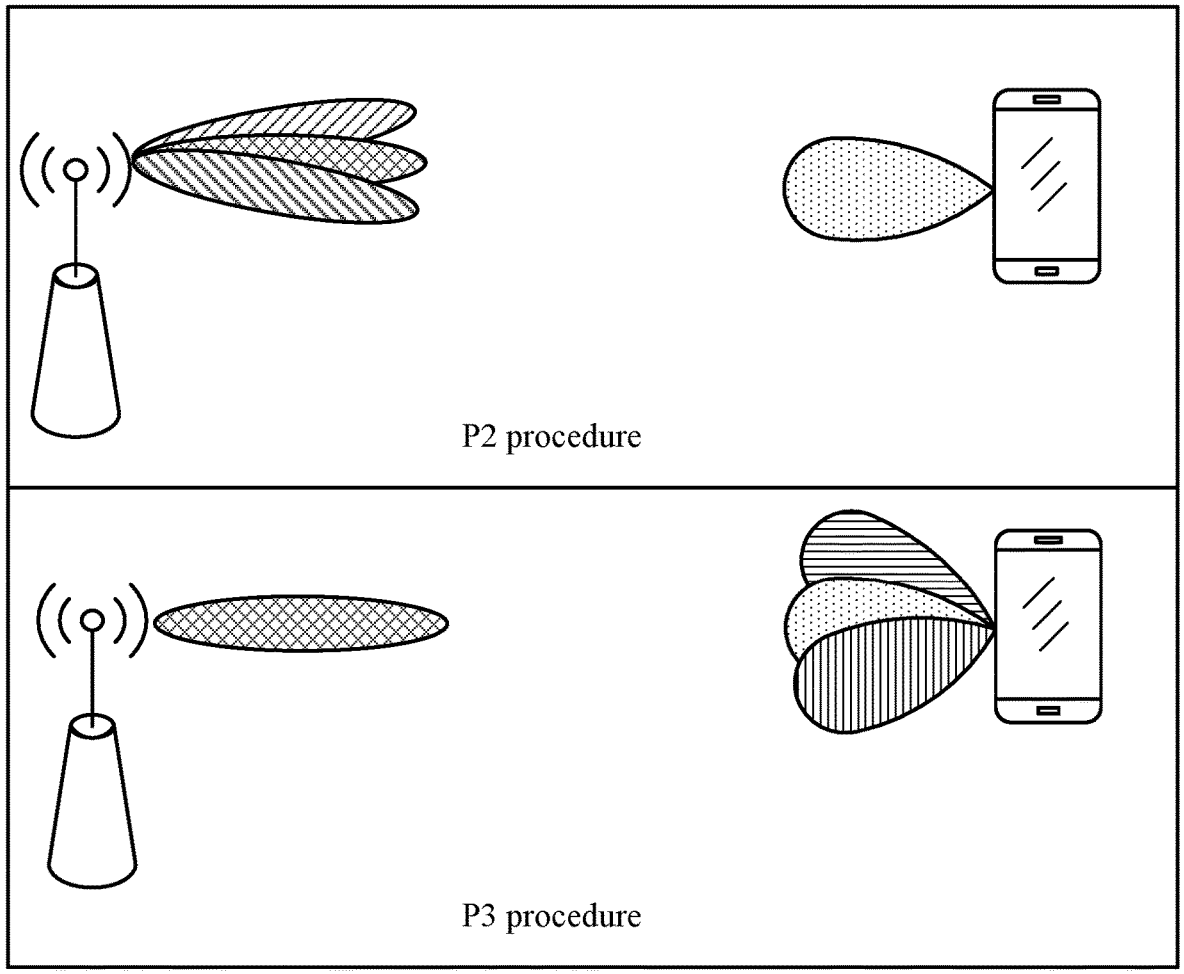
FIG. 8 illustrates example beam refinement procedures, in which aspects of the present disclosure may be utilized.

As described herein, for example, with respect to FIG. 8, a UE's initial access to a BS communicating via beams may be simplified with assistance from a BS operating in a lower frequency spectrum. With the assistance of the BS operating in a lower frequency spectrum, mmWave resources may be conserved and, in certain scenarios, initial synchronization to the mmWave network may completely or partly be bypassed.

UEs 120 may be configured to perform the operations 900 and methods described herein for determining a transmit power. BS 110 may comprise a transmission reception point (TRP), Node B (NB), 5G NB, access point (AP), new radio (NR) BS, Master BS, primary BS, etc.). The NR network 100 may include the central unit. The BS 110 may perform the operations 1000 and other methods described herein for providing assistance to a UE in determining a transmit power to use during a RACH procedure with another BS (e.g., a secondary BS).

A UE 120 may determine a transmit power for transmitting a message during a RACH procedure with a secondary BS, based at least in part, on communication between the UE and a primary BS. The UE may transmit the message to the secondary BS during the RACH procedure based, at least in part, on the determined transmit power.

A BS 110, such as a master BS or a primary BS, may communicate with the UE and may take one or more actions to assist the UE in setting a transmit power for transmitting a message during the RACH procedure with a secondary BS.

As illustrated in FIG. 1, the wireless network 100 may include a number of BSs 110 and other network entities. According to one example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
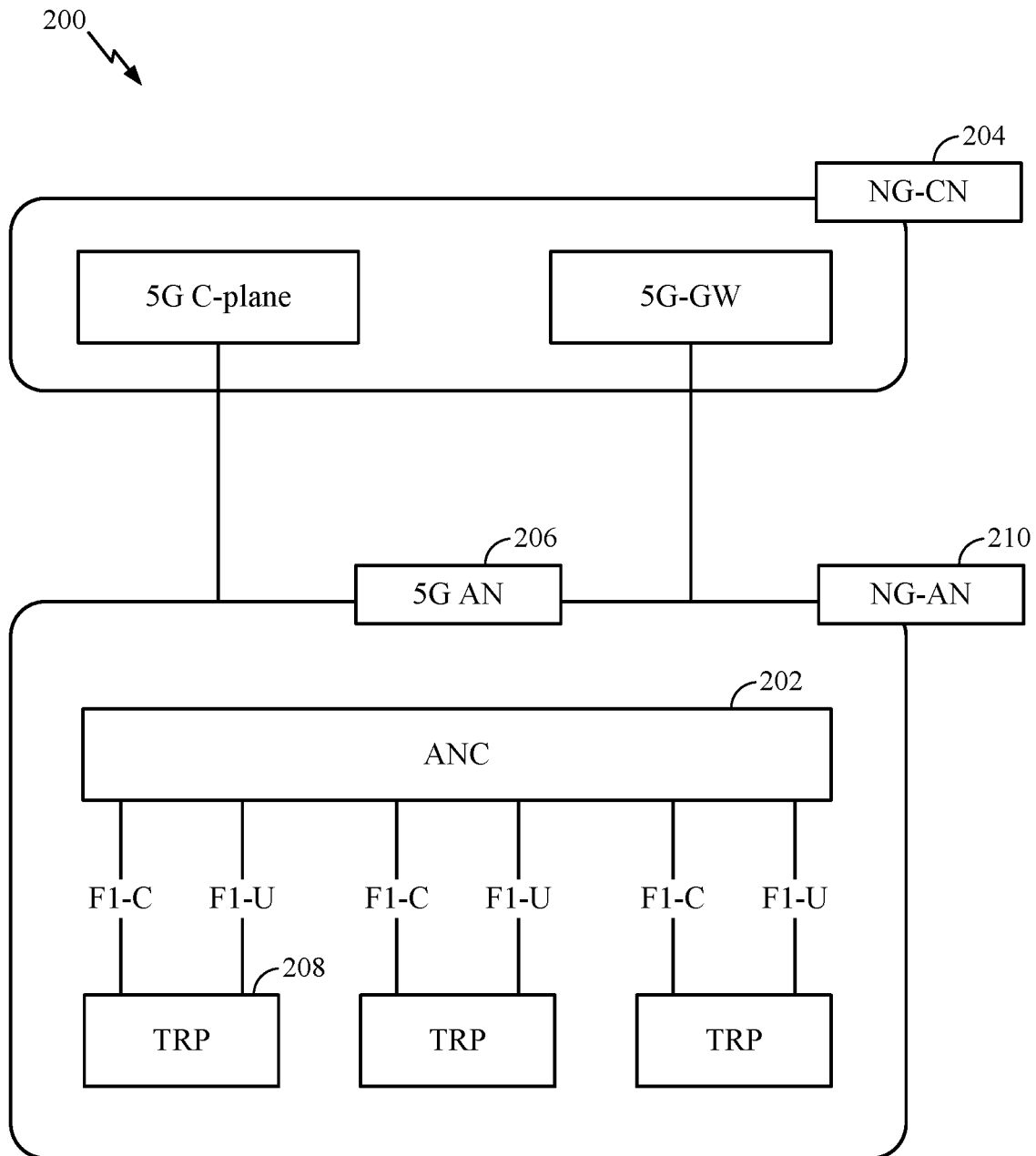
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
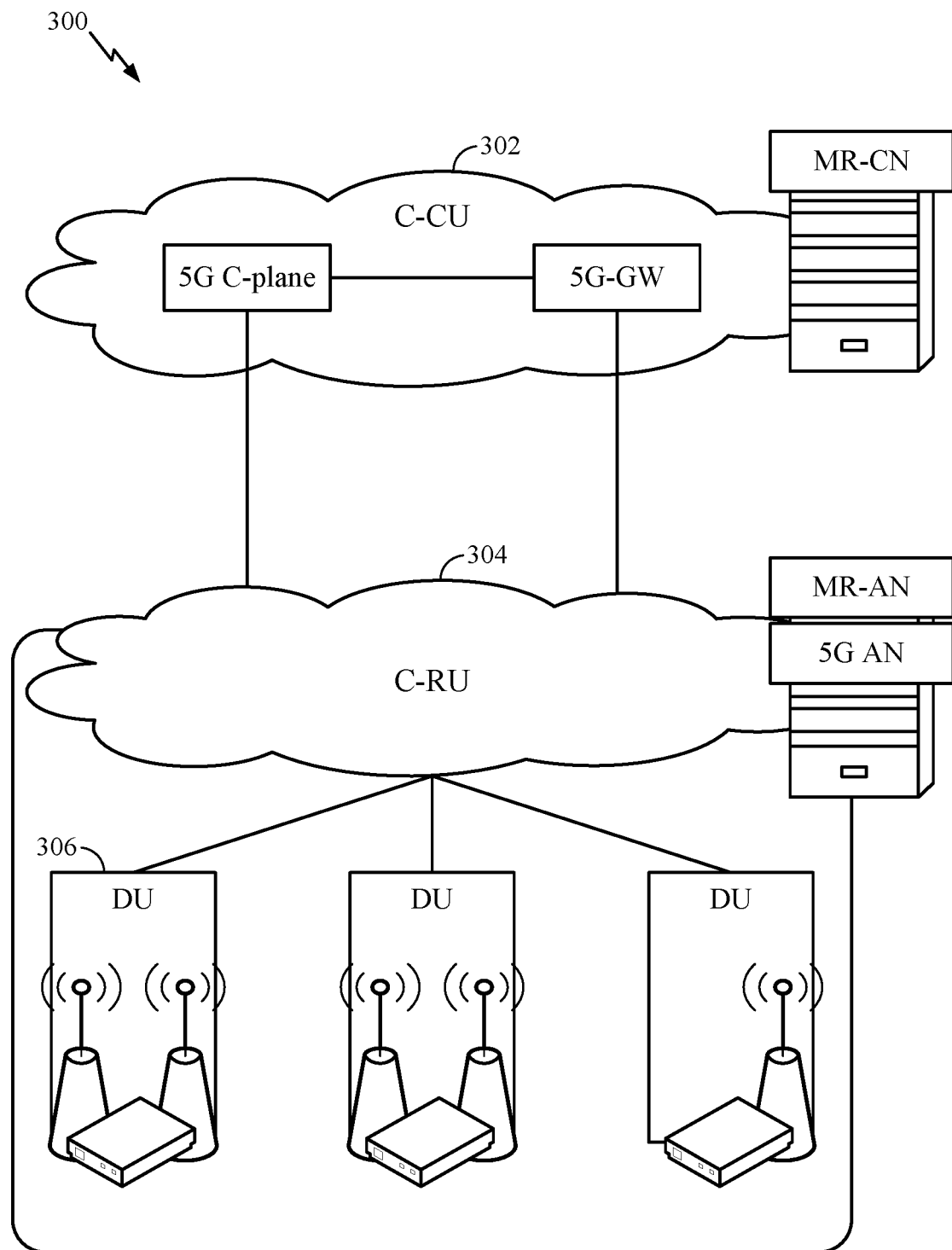
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
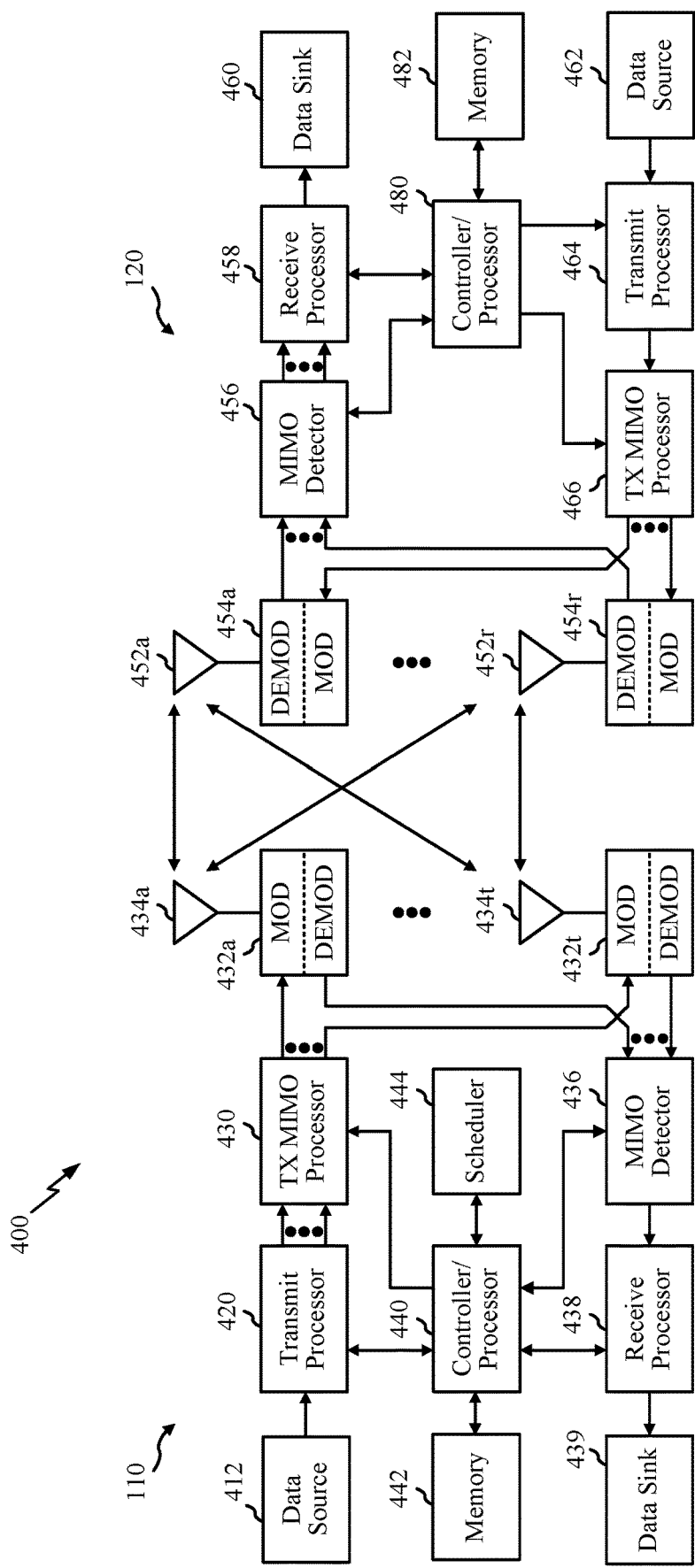
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
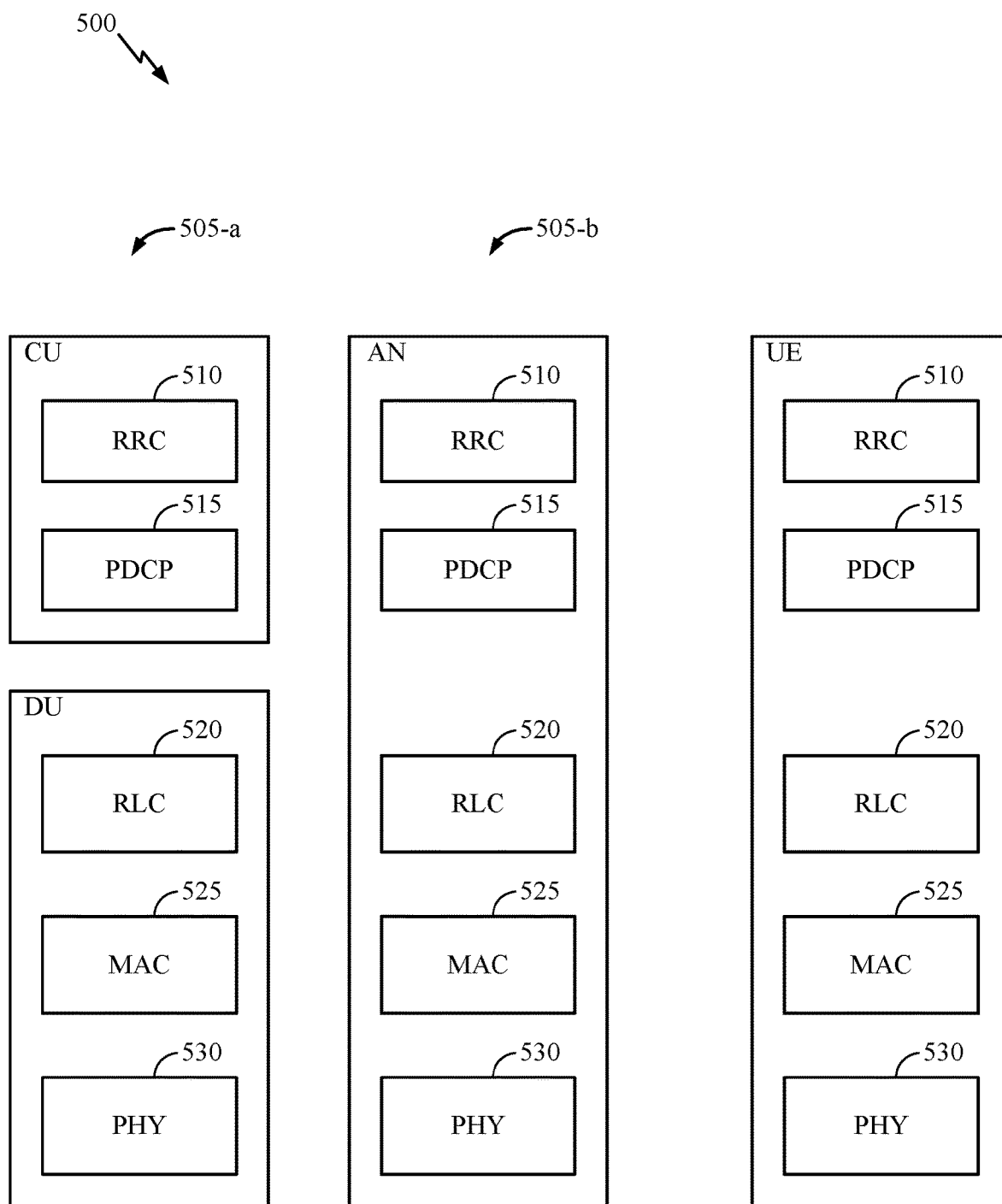
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
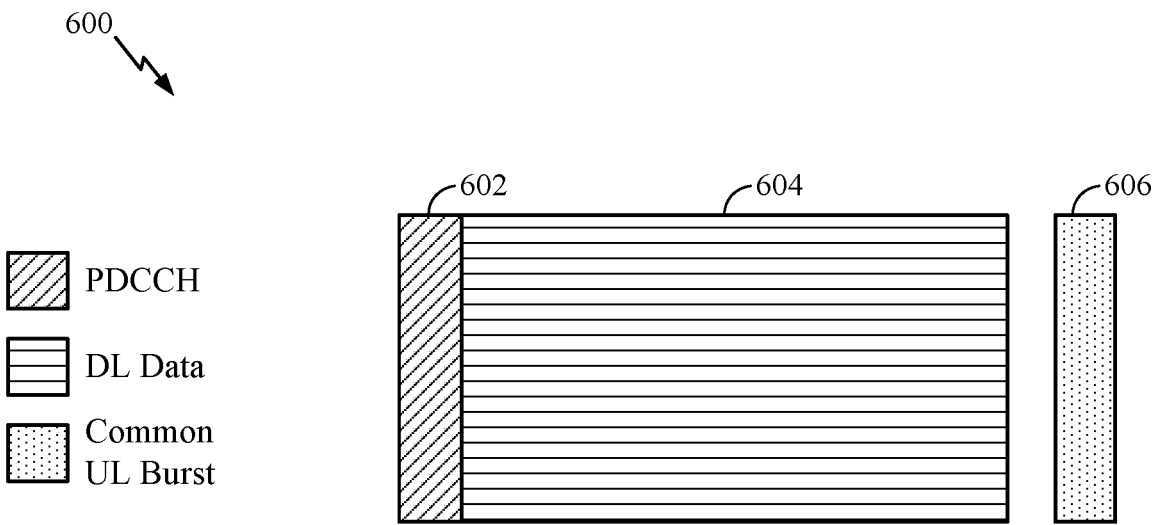
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
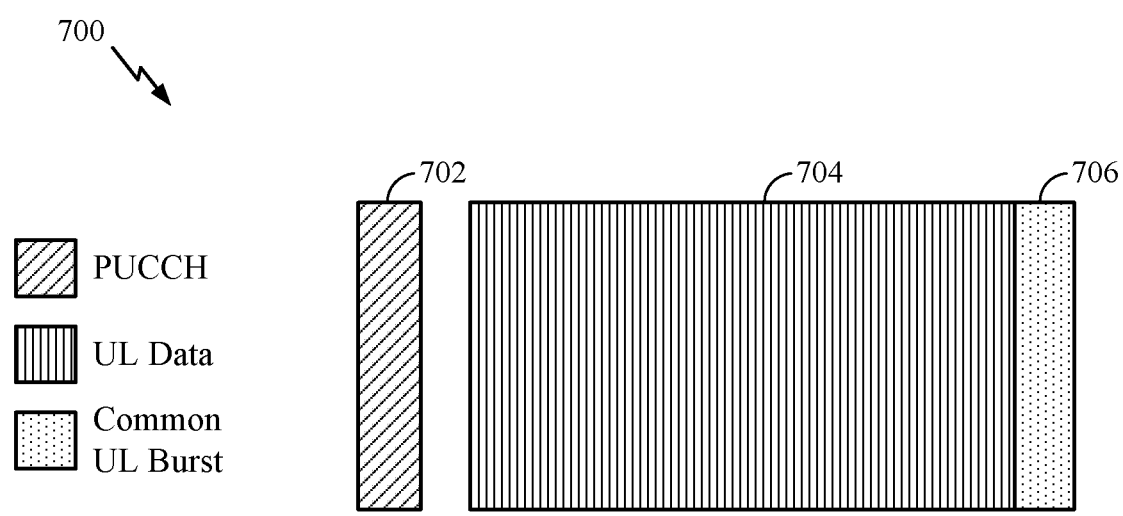
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Procedure Information (BPI) for CSI-RS

As noted above, in millimeter wave (MMW) cellular systems, beam forming may be needed to overcome high path-losses. Both the base station (BS) and the user equipment (UE) may help find and maintain suitable beams to enable a communication link. A link between the BS and a UE involves a BS beam and a UE beam. The BS beam and the UE beam form what may be referred to as a beam pair link (BPL). For downlink transmissions, a BPL includes a BS transmit beam and a UE receive beam. For uplink transmissions, a BPL includes a UE transmit beam and a BS receive beam, As a part of beam management, beams which are used by the BS and UE may be refined from time to time, to help account for changing channel conditions, for example, due to movement of the UE or other objects.

FIG. 8 graphically illustrates two such beam refinement procedures, referred to as P2 and P3. As illustrated, P2 generally refers to a procedure to refine a transmit beam used by the base station, while P3 generally refers to a procedure to refine a receive beam used by the UE.

As shown in FIG. 8, for procedure P2, the BS transmits using different transmit beams. In some cases, the different transmit beams may be selected to be directionally close (around within a few degrees) to an old/current beam (the center beam in FIG. 8). In the P2 procedure, the UE keeps its receive beam constant and measures the received power (RSRP) or another channel metric such CQI for each transmitted beam. The UE then identifies the BS beam with the best performance and reports it as feedback to the BS.

As shown in FIG. 8, for procedure P3, the BS transmits with a same beam (e.g., the current established beam of the link) while the UE evaluates different receive beams pointing in directions. The UE may choose to evaluate receive beams that are directionally close to an old/current beam (center beam in FIG. 8). The UE measures the performance of each beam and chooses the best receive beam. In some cases, the UE may report the performance of new receive beam (or beam pair) to the BS.

In 5G-NR the P2/P3 procedures are conducted using channel state information (CSI) reference signal (CSI-RS) transmission bursts. Each CSI-RS burst consists of several (time/frequency) resources. Each resource typically occupies 1 symbol period in the time domain and spans a certain bandwidth in the frequency domain. In each resource, the BS will transmit using one or more beams. During CSI-RS setup, the UE typically receives information that allows it to monitor for and process the CSI-RS transmissions. This information typically includes the number of resources involved in a CSI-RS burst, the number of beams transmitted simultaneously by the BS during a resource, and the manner by which the waveforms for the different beams are frequency multiplexed within the resource.

Figure 9A:
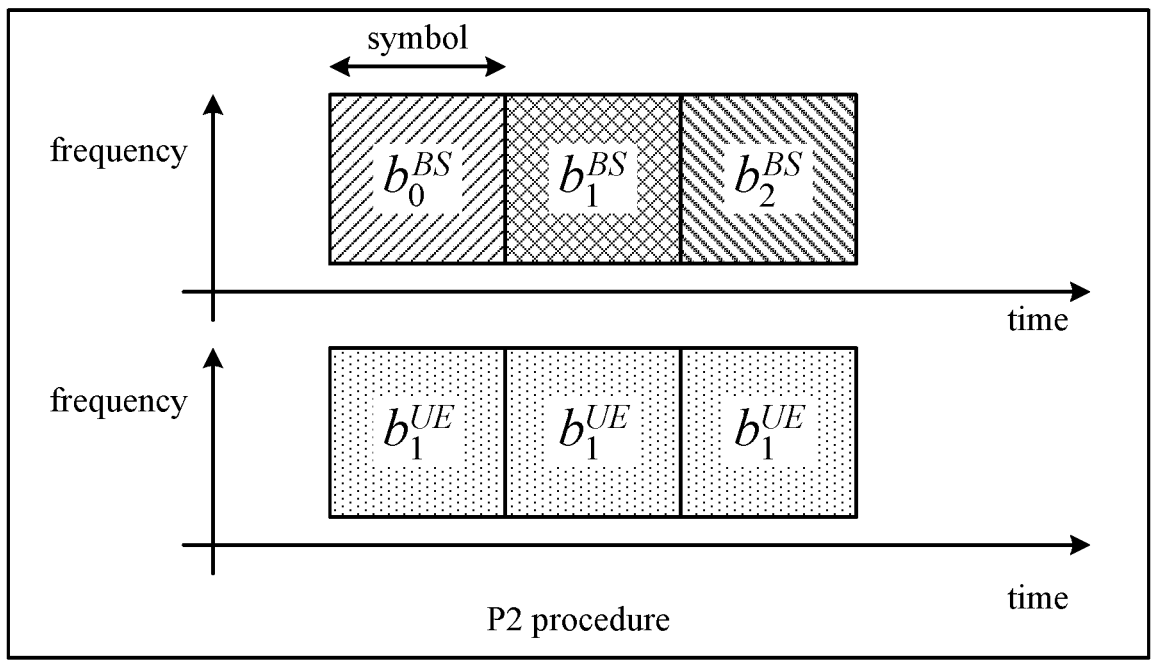
FIG. 9A illustrates an example timeline of the transmit beam refinement (P2) procedure shown in FIG. 8.
Figure 9B:
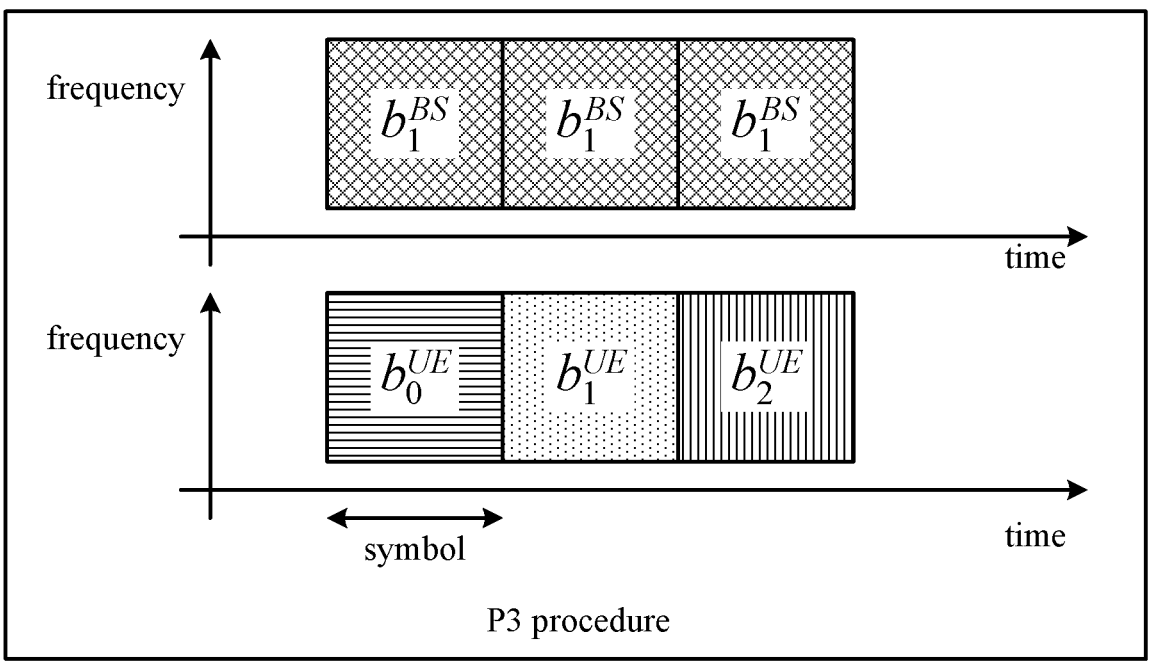
FIG. 9B illustrates an example timeline of the receive beam refinement (P3) procedure shown in FIG. 8.

FIGS. 9A and 9B show examples how transmit and receive beams may be varied for CSI-RS transmissions during the P2 and P3 procedures. In these relatively simple examples, the BS transmits one beam per resource (a symbol in these examples). As illustrated, the number of beams that are to be evaluated in each procedure may equal the number of symbols/resources of the CSI-RS burst. In the illustrated examples, the CSI-RS symbols are adjacent.

FIG. 9A illustrates how, during the P2 procedure, the BS changes transmit beams each symbol, while the UE keeps its receive beam the same. FIG. 9B illustrates how, during the P3 procedure, the BS keeps the transmit beam the same, allowing the UE to evaluate different receive beams in different symbol periods.

The CSI-RS bursts are usually aperiodic and are triggered by a DCI (downlink control information) conveyed through the PDCCH (physical downlink control channel). As will be described below, in some cases, so-called beamforming procedure information (BPI) may need to be conveyed via such DCI. The BPI may indicate whether a base station uses a same transmit beam or a set of different transmit beams for CSI-RS transmissions. This information may help a base station and UE optimize beam refinement procedures.

In cases where several beam pair links (BPLs) have been established between a BS and UE, the BS may need to inform the UE for which BPL a beam refinement is going to be performed. This information may be referred to as QCL (quasi colocation) information. The name refers to the fact that the BS points out to the UE that during the scheduled CSI-RS burst, the BS will use beams that are similar (quasi co-located) to the BS beam used for the specified BPL (e.g., similar in that they are reasonably expected to experience relatively same channel conditions). The QCL information may be conveyed as part of the DCI.

One challenge addressed by aspects of the present disclosure, is the fact that, besides QCL information, no more information regarding the beamforming procedure is typically conveyed to the UE. As a result, the UE may not even know whether a P2 or P3 procedure is being performed, which may make it difficult for the UE to decide which receive beam(s) to use. For example, while the UE may know the current BPL involved and can prepare an adequate receive beam (e.g., beam $b_1^{UE}$ in FIGS. 9A and 9B), it may still need to know whether it should keep this beam constant during the entire burst (as it should for the P2 procedure) or whether it should try out alternate receive beams in different symbols (as it should for the P3 procedure).

Aspects of the present disclosure, however, provide beamforming procedure information (BPI) that may help a UE meet the expectation of the BS, for example, by letting the UE know whether the BS is using the same or different beam(s) in all symbols.

In this manner, aspects of the present disclosure may help resolve the ambiguity described above by configuring the BS to convey BPI to indicate which CSI-RS resources (e.g., of a CSI-RS burst) are transmitted using a same BS transmit beam.

Figure 10:
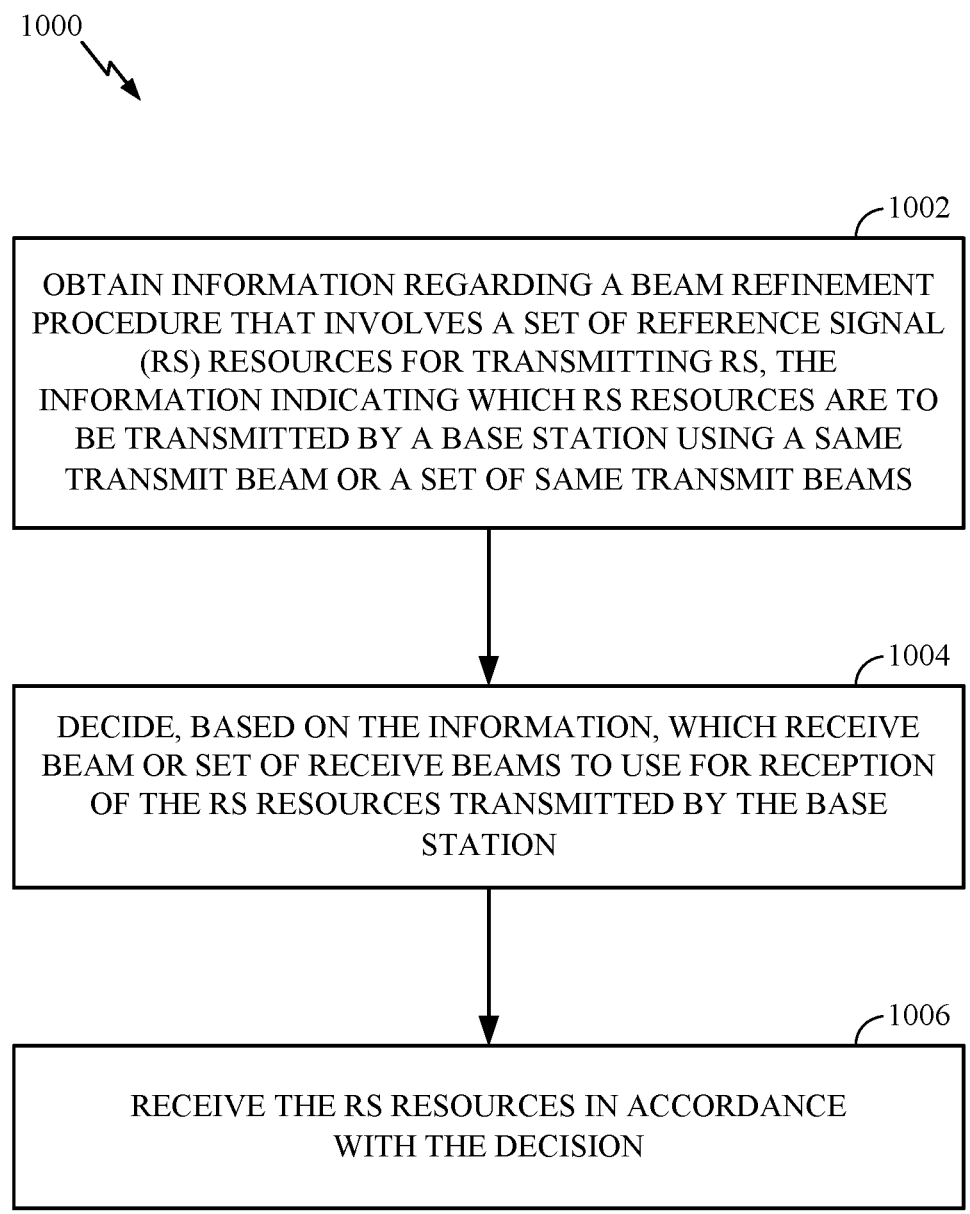
FIG. 10 illustrates example operations that may be performed by a user equipment (UE), in accordance with certain aspects of the present disclosure.

FIG. 10 illustrates example operations 1000 that may be performed by a user equipment (UE) to perform beam refinement, in accordance with certain aspects of the present disclosure.

Operations 1000 begin, at 1002, by obtaining information regarding a beam refinement procedure that involves a set of RS resources for transmitting RS, the information indicating which RS resources are to be transmitted by a base station using a same transmit beam. At 1004, the UE decides, based on the information, which receive beam or set of receive beams to use for reception of the RS resources transmitted by the base station. At 1006, the UE receives the RS resources in accordance with the decision. Operations 1000 may also include updating a UE receive beam of a beam pair link (BPL) based on the RS resource received in accordance with the decision.

Figure 11:
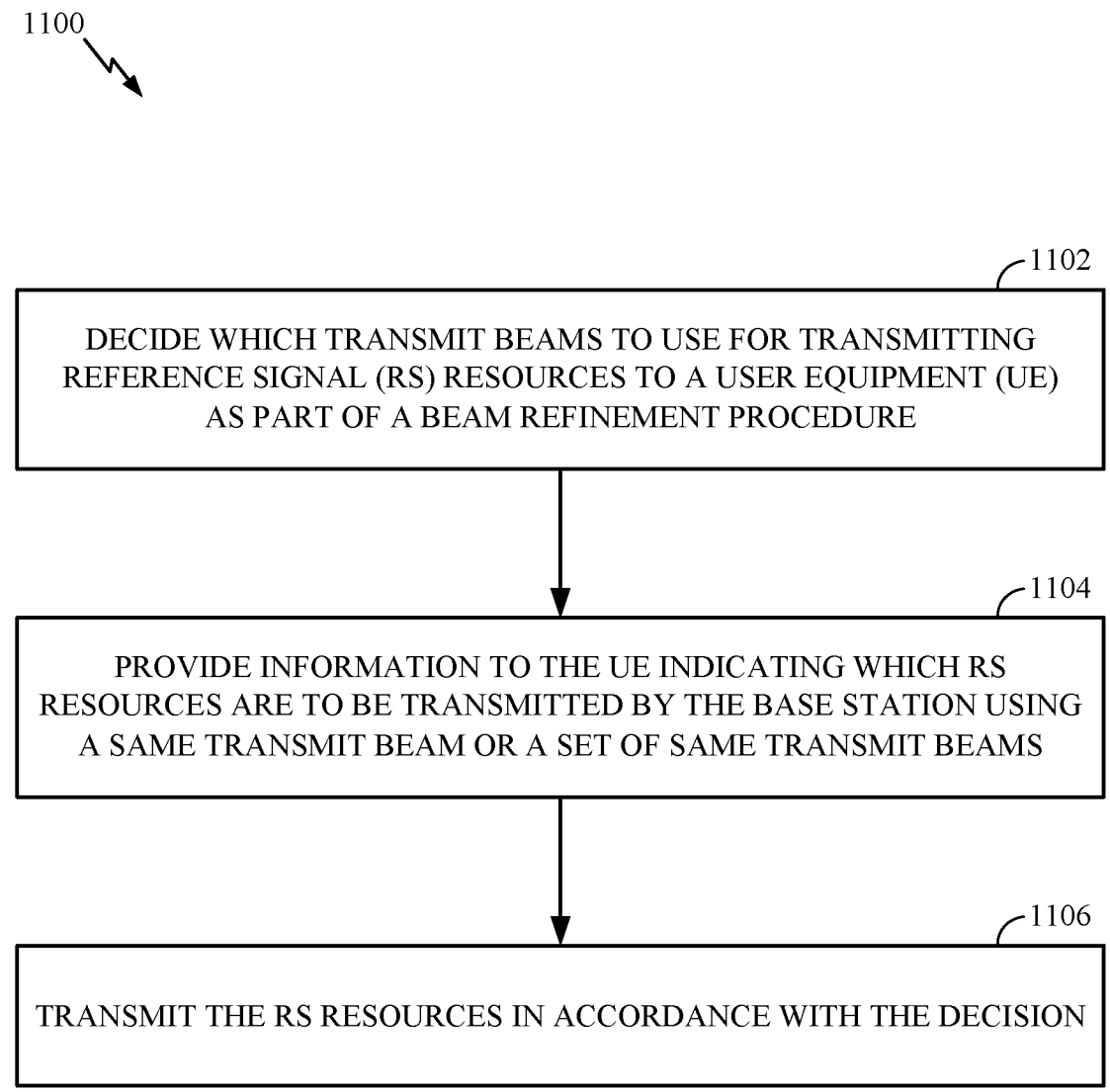
FIG. 11 illustrates example operations that may be performed by a base station, in accordance with certain aspects of the present disclosure.

FIG. 11 illustrates example operations 1100 that may be performed by a base station to configure a UE to perform beam refinement, in accordance with certain aspects of the present disclosure.

Operations 1100 begin, at 1102, by deciding which transmit beams to use for transmitting reference signal (RS) resources to a user equipment (UE) as part of a beam refinement procedure. At 1104, the BS provides information to the UE indicating which RS resources are to be transmitted by the base station using a same transmit beam. At 1106, the UE transmits the RS resources in accordance with the decision.

In general, aspects of the present disclosure provide that, for CSI-RS transmissions for beam management, the BS conveys BPI to the UE to indicate which CSI-RS resources (if any) are transmitted using the same beam(s). For those resources (transmitted using the same beam), the UE may try out different UE beams during reception (similar to a P3 procedure). On the other hand, any two resources with different BS beams (if any) should be evaluated by the UE using the same UE beam(s) during reception (similar to a P2 procedure).

In either case, the UE may measure the performance of resources, for example, in terms of RSRP or CQI using the best receive beam. The UE may report the performance of the N—best (N=1 in most cases) resources and indicate the resources to the BS.

In some cases, the BPI could be conveyed using just one bit. For example, 1 bit could be used to indicate either of the relatively simple P2/P3 procedures shown in FIG. 9A or 9B. If more elaborate sequences (as described below with reference to FIGS. 12-14) are to be used, the BPI may be conveyed using more bits. In any case, this information may be conveyed as DCI or could be conveyed as part of the resource/measurement/reporting (CSI-RS) configuration setup of the UE.

Figure 12:
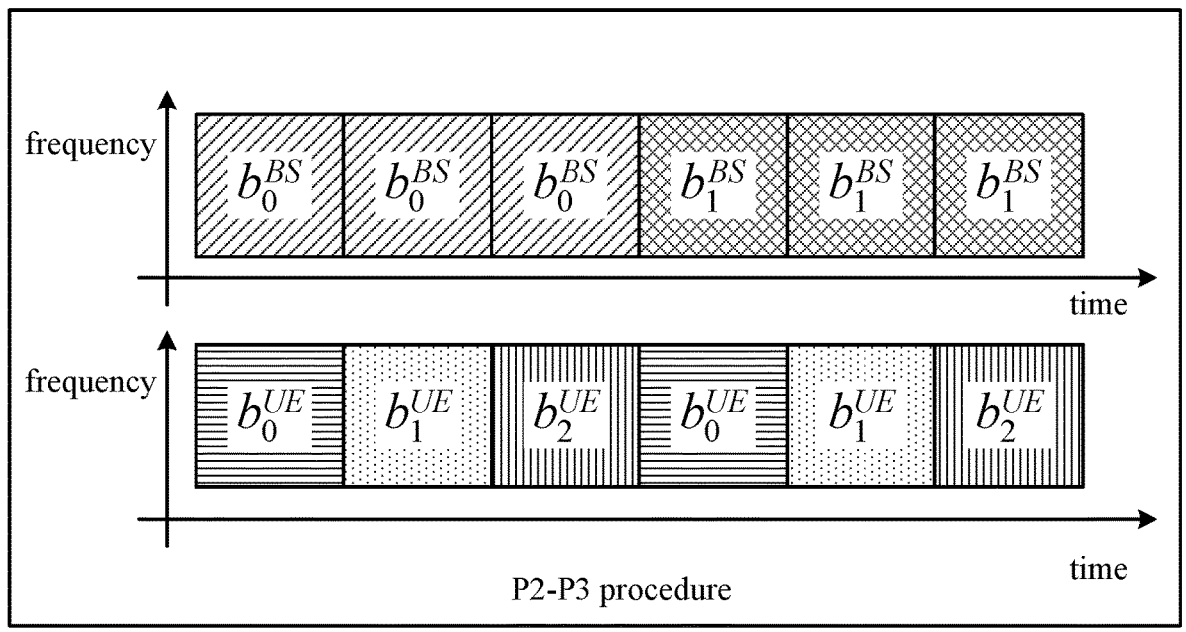
FIG. 12 illustrates an example timeline of a first beam refinement procedure, in accordance with certain aspects of the present disclosure.
Figure 13:
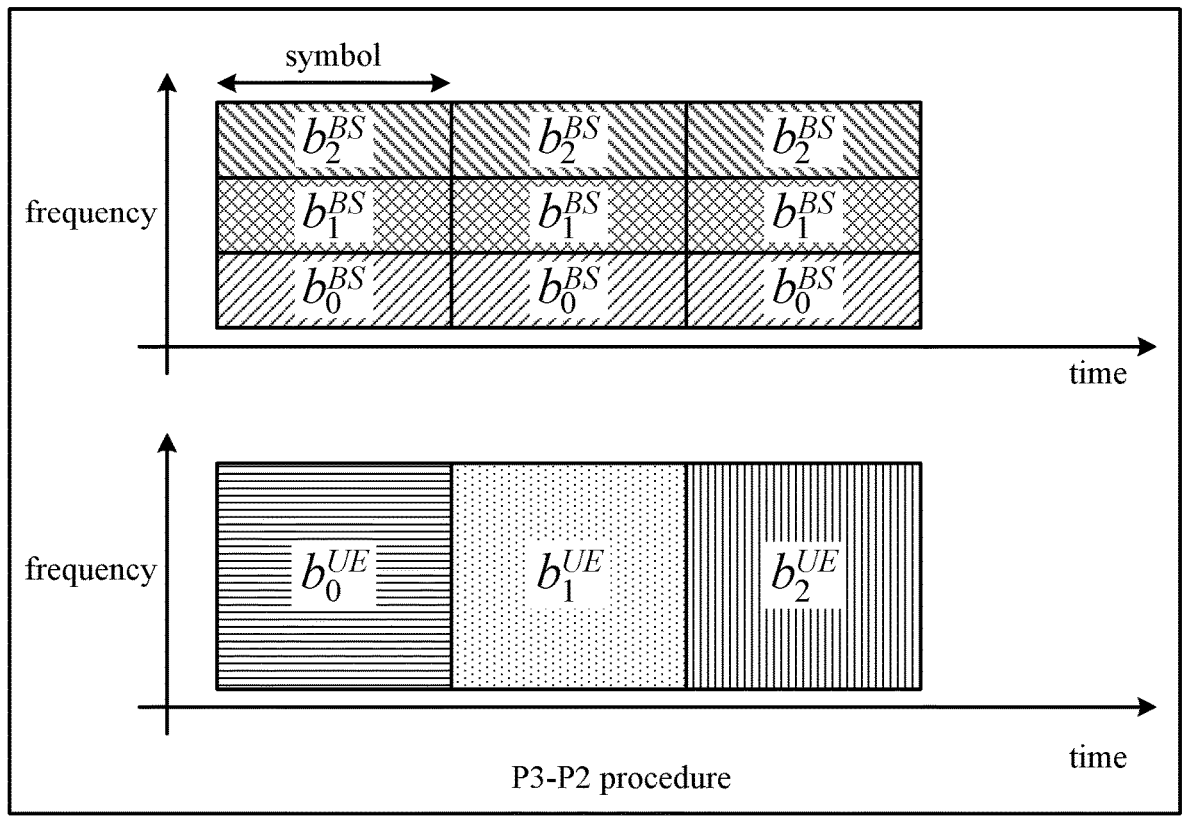
FIG. 13 illustrates an example timeline of a second beam refinement procedure with transmit beams multiplexed in frequency, in accordance with certain aspects of the present disclosure.
Figure 14:
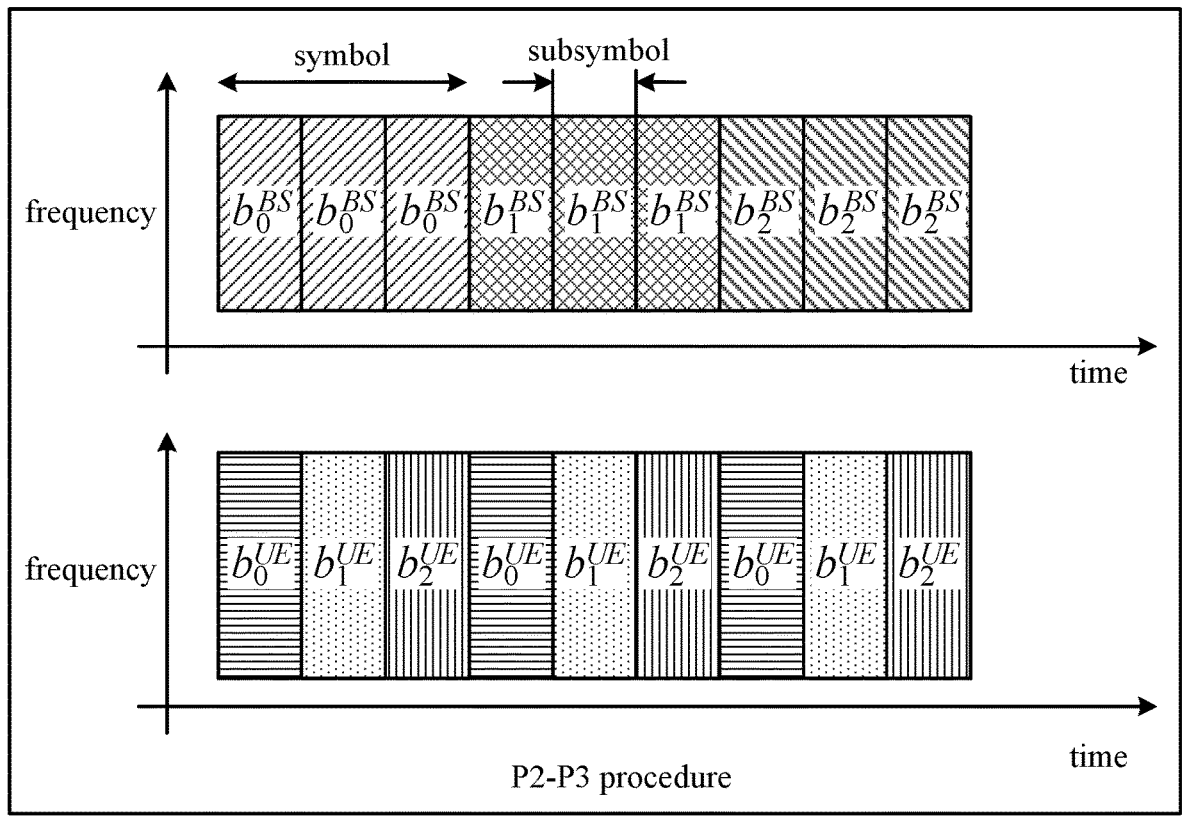
FIG. 14 illustrates an example timeline of a third beam refinement procedure with transmit beams multiplexed in time within a symbol, in accordance with certain aspects of the present disclosure.

FIGS. 12-14 illustrate examples of different types of beam sequences that could be used at the BS and UE, with corresponding beam procedure information, according to aspects of the present disclosure.

FIG. 12 shows an example where a P3 procedure is effectively nested within a P2 procedure. In this example, the beam procedure information (BPI) may indicate to the UE that a first set of resources (e.g., the first three symbols) are transmitted by the BS with the same beam $b_0^{BS}$. Given this indication, the UE can evaluate different receive beams during the first set of resources (the first three symbols).

The BPI may also indicate that a second set of resources (e.g., the next three symbols) also are transmitted with the same BS beam $b_1^{BS}$. This enables the UE to first find the best UE beam for the different transmit beams $b_0^{BS}$ and $b_1^{BS}$ individually, and then compare the performance, which may lead to efficient beam pair link (BPL selection). Ultimately, the best BS beam may be determined, for each set of symbols, and reported together with its performance metric.

While the example of FIG. 12 shows the UE evaluating the same receive beam for each set of symbols, in some cases, the UE may choose or decide on a different set of receive beams for the second set of symbols than the first set (e.g., a subset or superset of the received beams evaluated during the first set of symbols or a completely different set).

FIG. 13 illustrates another example, where the BS transmits different beams (e.g., 3 beams) per CSI-RS resource. In this example, the waveforms of the beams are frequency multiplexed. Procedurally, this may be effectively considered a P2 procedure nested within a P3 procedure, since during every symbol, a P2 sweep (of different transmit beams) is conducted in the "frequency domain." Across time, a P3 procedure is performed, with different receive beams evaluated across three symbols.

In this example, the BPI may indicate to the UE that all resources are transmitted with the same BS beams and, therefore, the UE can and should evaluate different receive beams for each resource. In this case, the BPI will be the same as the BPI for the case shown in FIG. 9B. Since the waveforms of the BS beams are frequency multiplexed, the UE can measure the performance of each BS beam separately. For ease of measurement and reporting procedures within the CSI-RS framework, each resource may effectively be split into 3 resources, where each new resource contains the waveform of a single BS beam.

FIG. 14 illustrates another example where the BS transmits one beam per resource, but the waveform is periodic in the time domain, such that 3 periods fit in one symbol (thus each period may be referred to as a sub-symbol). As illustrated, this approach enables the UE to evaluate three different beams (one per sub-symbol). Thus, procedurally this approach may be considered as performing a P3 sweep within a P2 sweep.

The periodicity of the waveform shown in FIG. 14 may be achieved by occupying only every n-th subcarrier (e.g., using a comb structure), where n=3 in this example. During CSI-RS setup, the UE may be informed of how the subcarriers of each resource are occupied (e.g., a periodicity of how RS is repeated in each symbol/sub-symbol). In such cases, this information does not need to be conveyed in the BPI. Given this information, the UE may know that it can evaluate different UE beams, per resource (symbol).

In the example shown in FIG. 14, the BPI may indicate to the UE that each resource has different beams. This means, for the UE, that it may need to use the same RX-beams ($b_0^{UE}$, $b_1^{UE}$, $b_2^{UE}$) for each resource. Also, in this example, the UE may report the best possible BS beam and its performance (when combined with the best possible receive beam).

In some cases, information regarding a transmit beam pattern (or patterns) used (across frequencies, symbols, or sub-symbols) for any of the techniques described herein may be provided as an index into a table. The table may list different combinations of transmit beam patterns for transmitting the RS resources and providing an index may be an efficient mechanism to signal a particular combination from the table (e.g., using only a few bits).

As described herein, by providing BPI, a UE may be able to intelligently select receive beams to evaluate during a beam refinement procedure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    obtaining information for performing a beam refinement procedure, wherein the information indicates which channel state information reference signals (CSI-RSs) of a set of CSI-RSs are to be transmitted by a base station using a same transmit beam;
    deciding, based on the information, which receive beams of a plurality of receive beams to use for receiving the CSI-RSs transmitted by the base station, wherein the receive beams used by the UE for receiving the CSI-RSs are different from the transmit beam used by the base station to transmit the CSI-RSs; and
    receiving the CSI-RSs in accordance with the decision.

2. The method of claim 1, further comprising updating a UE receive beam of a beam pair link (BPL) based on the CSI-RSs received in accordance with the decision.

3. The method of claim 1, further comprising providing feedback to the base station regarding the same transmit beam based on the CSI-RSs received in accordance with the decision.

4. The method of claim 1, wherein:
    the information indicates the same transmit beam comprises a first transmit beam used to transmit the CSI-RSs in each of a first set of multiple symbols; and
    the UE decides to use different receive beams to receive the CSI-RSs transmitted in the first set of multiple symbols.

5. The method of claim 1, wherein:
    the information indicates the same transmit beam comprises a first transmit beam used to transmit the CSI-RSs in each of a first set of sub-symbols within a symbol; and
    the UE decides to use different receive beams to receive the CSI-RSs transmitted in the first set of sub-symbols.

6. The method of claim 5, further comprising:
    determining, based on an RS configuration, a periodicity of the CSI-RSs repeated in each of the sub-symbols.

7. The method of claim 1, wherein the information is obtained via a downlink control information (DCI) transmission.

8. The method of claim 1, wherein the information is obtained with CSI-RS setup information.

9. The method of claim 1, wherein the information is provided as an index into a table with different combinations of transmit beam patterns for transmitting the CSI-RSs.

10. A method for wireless communication by a base station, comprising:
    deciding which transmit beams of a plurality of transmit beams to use for transmitting a set of channel state information reference signals (CSI-RSs) to a user equipment (UE) as part of a beam refinement procedure;
    providing, to the UE, information for performing the beam refinement procedure indicating which CSI-RSs of the set of CSI-RSs are to be transmitted by the base station using a same transmit beam of the plurality of transmit beams; and transmitting the CSI-RSs in accordance with the decision.

11. The method of claim 10, further comprising receiving feedback from the UE regarding the same transmit beam, based on the CSI-RSs transmitted to the UE.

12. The method of claim 10, wherein:
the information indicates the same transmit beam comprises a first transmit beam used to transmit the CSI-RSs in each of a first set of multiple symbols.

13. The method of claim 10, wherein:
the information indicates the same transmit beam comprises a first transmit beam used to transmit the CSI-RSs in each of a first set of sub-symbols within a symbol.

14. The method of claim 10, wherein the information is provided via a downlink control information (DCI) transmission.

15. The method of claim 10, wherein the information is provided with CSI-RS set up information.

16. The method of claim 10, wherein the information is provided as an index into a table with different combinations of transmit beam patterns for transmitting the CSI-RSs.

17. An apparatus for wireless communication by a user equipment (UE), comprising:
means for obtaining information for performing a beam refinement procedure, wherein the information indicates which channel state information reference signals (CSI-RSs) of a set of CSI-RSs are to be transmitted by a base station using a same transmit beam;
means for deciding, based on the information, which receive beams of a plurality of receive beams to use for receiving the CSI-RSs transmitted by the base station, wherein the receive beams used by the UE for receiving the CSI-RSs are different from the transmit beam used by the base station to transmit the CSI-RSs; and
means for receiving the CSI-RSs in accordance with the decision.

18. An apparatus for wireless communication by a base station, comprising:
means for deciding which transmit beams of a plurality of transmit beams to use for transmitting a set of channel state information reference signals (CSI-RSs) to a user equipment (UE) as part of a beam refinement procedure;
means for providing, to the UE, information for performing the beam refinement procedure indicating which CSI-RSs of the set of CSI-RSs are to be transmitted by the base station using a same transmit beam of the plurality of transmit beams; and
means for transmitting the CSI-RSs in accordance with the decision.

19. An apparatus for wireless communication by a user equipment (UE), comprising:
at least one processor configured to:
obtain information for performing a beam refinement procedure, wherein the information indicates which channel state information reference signals (CSI-RSs) of a set of CSI-RSs are to be transmitted by a base station using a same transmit beam;
decide, based on the information, which receive beams of a plurality of receive beams to use for receiving the CSI-RSs transmitted by the base station, wherein the receive beams used by the UE for receiving the CSI-RSs are different from the transmit beam used by the base station to transmit the CSI-RSs, and
receive the CSI-RSs in accordance with the decision; and
a memory coupled with the at least one processor.

20. An apparatus for wireless communication by a base station, comprising:
at least one processor configured to:
decide which transmit beams of a plurality of transmit beams to use for transmitting a set of channel state information reference signals (CSI-RSs) to a user equipment (UE) as part of a beam refinement procedure;
provide, to the UE, information for performing the beam refinement procedure indicating which CSI-RSs of the set of CSI-RSs are to be transmitted by the base station using a same transmit beam of the plurality of transmit beams; and
transmit the CSI-RSs in accordance with the decision; and
a memory coupled with the at least one processor.

* * * * *